United States Patent [19]

Tanaka et al.

[11] Patent Number: 4,464,148

[45] Date of Patent: Aug. 7, 1984

[54] RIBBED BELT

[75] Inventors: Hiroyuki Tanaka, Kobe; Tadashi Yamaguchi, Kasugai, both of Japan

[73] Assignee: Mitsuboshi Belting Ltd., Kobe, Japan

[21] Appl. No.: 469,816

[22] Filed: Feb. 25, 1983

Related U.S. Application Data

[63] Continuation of Ser. No. 196,110, Oct. 10, 1980, abandoned.

[51] Int. Cl.³ .......................... F16G 1/00; F16G 5/00
[52] U.S. Cl. .................................. 474/167; 474/168; 474/238
[58] Field of Search ..................... 156/138, 142, 137; 51/105 R, 105 C; 409/179, 303; 407/31, 30, 56, 61; 29/558, 41 X, 557; 83/925 EB, 425.3, 425.2, 875, 876, 884, 887; 474/238, 170, 167, 168, 252

[56] References Cited

U.S. PATENT DOCUMENTS

| | | | |
|---|---|---|---|
| 2,398,763 | 4/1946 | Bagne | 407/61 |
| 2,728,239 | 12/1955 | Adams, Jr. | 474/238 |
| 3,818,576 | 6/1974 | Braden et al. | 29/558 |
| 3,891,405 | 6/1975 | Huber | 51/105 R |
| 4,047,446 | 9/1977 | Speer | 474/238 |
| 4,330,287 | 5/1982 | Fischer | 474/252 |

FOREIGN PATENT DOCUMENTS 55-10135  1/1980  Japan .................................. 474/238

Primary Examiner—Michael W. Ball
Attorney, Agent, or Firm—Wood, Dalton, Phillips, Mason & Rowe

[57] ABSTRACT

A method of making a ribbed belt having a plurality of longitudinally extending ribs is provided, wherein a vulcanized belt sleeve is put into one mandrel or said belt sleeve laid over two mandrels and cut with a milling attachment combining multiple double angle milling cutters in such a manner that the rotation of the milling attachment is opposed to that of the mandrel and the revolution speed of the milling attachment is greater than that of the mandrel, thus precisely defining a ribbed section of the belt in a simultaneous manner.

7 Claims, 9 Drawing Figures

RIBBED BELT

This is a continuation, of application Ser. No. 196,110 filed Oct. 10, 1980, now abandoned.

BACKGROUND OF THE INVENTION

1. Field of the Invention

This invention relates to power transmission belt manufacture and more particularly to a method of making an endless power transmission ribbed belt. Such a ribbed belt is thin and flexible compared with ordinary V-belts, and is excellent in high-speed rotation and its ability to transmit power. Such ribbed belts are, therefore, widely used in drive devices of automobiles wherein the power transmission belt is arranged in a serpentine path about the crank pulley, alternator pulley, a cooler pulley, etc.

2. Description of the Background Art

A method (1) of forming a belt using a tubular matrix is disclosed in U.S. Pat. Nos. 3,839,116 and 3,981,206. The method disclosed therein comprises building up successively a lower fabric, a lower rubber layer, a tensile member, an upper rubber layer, and an upper fabric, on a tubular matrix having a plurality of V-grooves in a circumferential direction inserted into a cylindrical drum, to form a vulcanized belt sleeve having a plurality of V-grooves. The belt sleeve is then cut into individual belts.

Another method (2) of forming a belt using a grinding wheel is disclosed in U.S. Pat. Nos. 3,818,576, 3,822,516, and 4,177,688, in which the vulcanized belt sleeve is formed on a mandrel and ground with a contoured grinding wheel to precisely define the desired plurality of longitudinally extending ribs.

Another method (3) of forming a belt is using a Rotocure mechanism as disclosed in U.S. Pat. No. 4,139,406, in which a formed belt sleeve is laid over the Rotocure mechanism having a plurality of V-grooves to define the desired ribbed section belt.

A casting method (4) of forming a belt is disclosed in U.S. Pat. No. 3,813,197 and Great Britain Pat. No. 1,123,225, which comprises the fixing of an inner mold having a fabric and a tensile member wound thereon, in an outer mold having a plurality of V-grooves arranged circumferentially along its inner surface, casting urethane elastomeric material in the mold cavity to form a belt sleeve, and cutting the belt sleeve into the desired final belts.

In carrying out methods (1), (2) and (3), the method using a grinding wheel (2) and the method using Rotocure (3), the ribbed belts may be made of an ordinary rubber, such as NR, SBR, CR, etc. In method (1), the use of a flat lower rubber layer on the tubular matrix is disadvantageous in that the tensile members may fall into the V-grooves of the tubular matrix during vulcanization and thus become arranged randomly, which may result in an undesirable stretchable belt. However, the use of a ribbed lower rubber layer prevents such defects, and the manufacture of the belts is facilitated and improved. Another serious disadvantage in method (1) lies in the difficulty of removing the formed belt sleeve from the tubular matrix which conventionally causes a short lift of the tubular matrix.

In method (2), the surface temperature of the vulcanized belt sleeve reaches more than 100° C. during the grinding process so that reversion, due to a break in the intermolecular bonds, occurs on the surface of the sleeve. This may produce troublesome sticky adhesion. Also, since the yieldable belt sleeve is deformed by the grinding wheel during the grinding operation, it is difficult to grind the V-grooves accurately. The material and roughness of the grinding wheel must be correlated with the hardness of the belt sleeve.

A problem arises in the method (3) manufacture in that the belt sleeve shrinks when it is removed from the heated Rotocure mechanism. The thermal efficiency of the process is therefore very low because the Rotocure mechanism must be cooled before the belt sleeve is removed necessitating repeating heating and cooling steps.

The above mentioned methods, which have been developed for making ribbed belts, have drawbacks concerning the accuracy of the V-grooves, sticky adhesion of rubber in proportion to the generation of heat, dimensional instability after vulcanization, high cost, etc.

SUMMARY OF THE INVENTION

The present invention provides an improved belt manufacture eliminating the disadvantages of the background art methods discussed above in a novel and simple manner.

An object of the invention is to provide a method of making a ribbed belt in which the V-grooves of the ribbed belt are accurately formed.

Another object of the invention is to provide such a method of making a ribbed belt in which the cutting of the V-grooves is effected in such a manner as to prevent sticky adhesion of the vulcanized belt sleeve.

The improved belt manufacture method of the present invention comprises the steps of placing a vulcanized belt sleeve in a mandrel, rotating the mandrel, and operatively associating a milling attachment having multiple double angle milling cutters with the rotating belt sleeve, the rotation of the milling attachment being opposed to that of the mandrel and the revolution speed of the milling attachment being larger than that of the mandrel, thus to accurately cut V-grooves into the belt sleeve, and to cut the belt sleeve produced in this manner into the desired belts.

BRIEF DESCRIPTION OF THE DRAWING

This invention will be described in detail with reference to the accompanying drawings wherein.

DESCRIPTION OF THE PREFERRED EMBODIMENTS

Figure 1:
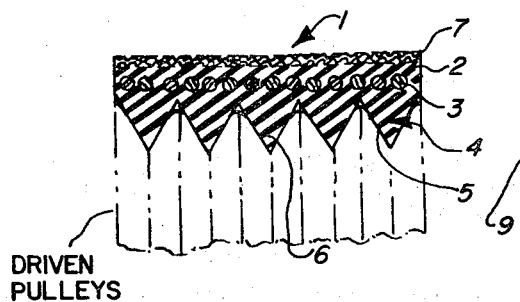
FIG. 1 is a transverse section, with parts cut away, showing a ribbed belt formed by a manufacturing process embodying the invention.

Reference is now made to FIG. 1 of the drawing which illustrates one exemplary embodiment of a ribbed belt, generally designated 1, manufactured by the improved process of the invention. Ribbed belt 1 is made primarily of elastomeric material and comprises an upper rubber layer 2, a ropelike tensile member 3 made of, for instance, polyester fibers or aromatic polyamide fibers high in strength and low in elongation, and a ribbed section 4 defined by a plurality of longitudinally extending V-grooves 5 and ribs 6 having a triangular cross section configuration. As shown, upper rubber layer 2 of belt 1 may be provided with an outer fabric cover layer 7.

Figure 2:
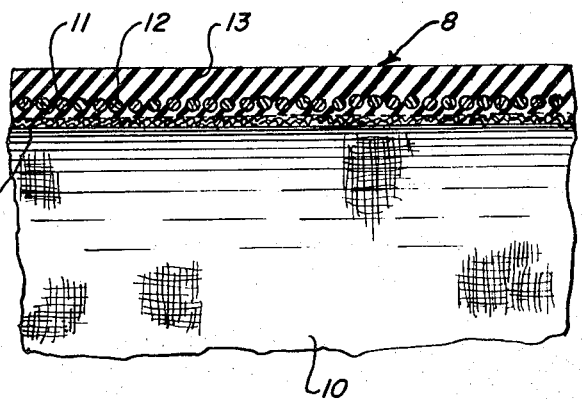
FIG. 2 is a fragmentary section showing a first step in the method of forming the vulcanized belt sleeve.

Belt 1 is formed from a sleeve 8. The manufacture of sleeve 8 is illustrated in FIG. 2.

As shown, a stretchable fabric 9 is wound onto a cylindrical drum 10 in one or more plies. Fabric 9 comprises a bias fabric having high stretchability, and may illustratively have warps and wefts forming a cross angle of 90 to 155 degrees. A lower rubber layer 11 is wound on the fabric 9. Thereafter, a ropelike tension member 12 made of, for instance, polyester fibers high in strength and low in elongation and covered with a cushioning rubber layer, is spirally wound onto lower rubber layer 11. The thickness of upper rubber layer 13 is preferably greater than that of lower rubber layer 11. Upper rubber layer 13 is laminated on the layer of the tensile member 12 and the assembly thus obtained is vulcanized in accordance with techniques well known in the art to form the completed belt sleeve 8.

The vulcanized belt sleeve is removed from the drum 10 and placed on an expandable mandrel 15. The belt sleeve is then cut by means of a milling attachment 14. The rotating milling attachment 14 cuts the rotating belt sleeve 8 in a novel manner to provide an improved highly accurate ribbed configuration.

As shown, belt sleeve 8 is placed on mandrel 15 so that upper rubber layer 13 defines the radially outer surface 31 of the belt sleeve. Prior to placing the belt sleeve on the mandrel, an expandable tubular member 16 may be mounted concentrically around the mandrel and preferably held in position by the frictional engagement of its inner surface with the outer surface of the mandrel. The expandable tubular member 16 is desirable in preventing damage to the cutter blades in the finishing process. Tubular member 16 illustratively may be formed of an inexpensive elastomeric material.

Mandrel 15 is then rotated in the indicated arrow direction by a suitable drive (not shown) connected to a drive shaft 17 of the mandrel.

Figure 3:
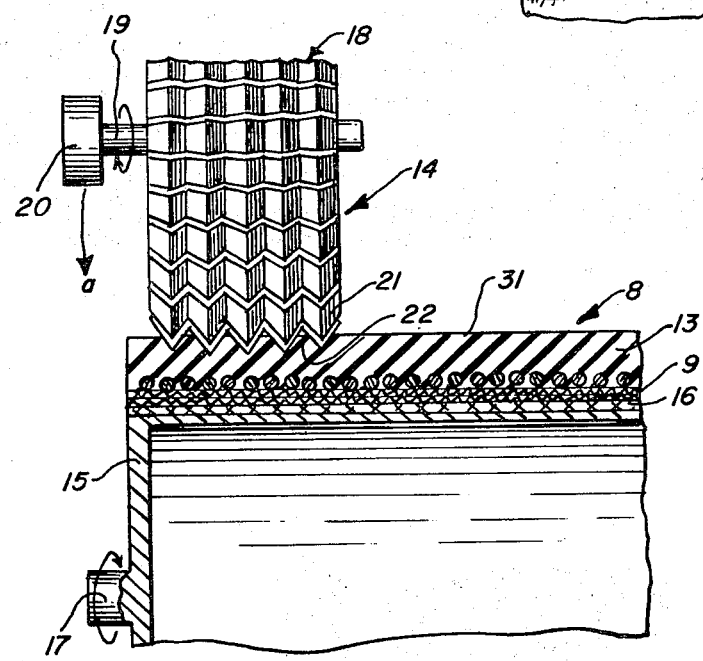
FIG. 3 is a fragmentary sectional view illustrating the method of cutting the V-grooves in the sleeve in one form of the invention.

Milling attachment 14 includes a plurality of double angle milling cutters 18 carried on a drive shaft generally designated 19, and a drive means 20 for driving drive shaft 19 in an opposite direction of rotation as indicated by the arrow in FIG. 3. The number of double angle milling cutters 18 mounted on drive shaft 19 is determined by the number of V-grooves desired in the ribbed belt. The surface configuration of the milling attachment comprises V-shaped protrusions 21 and V-shaped grooves 22 corresponding to the configuration of ribbed section 4 of belt 1.

Figure 4:
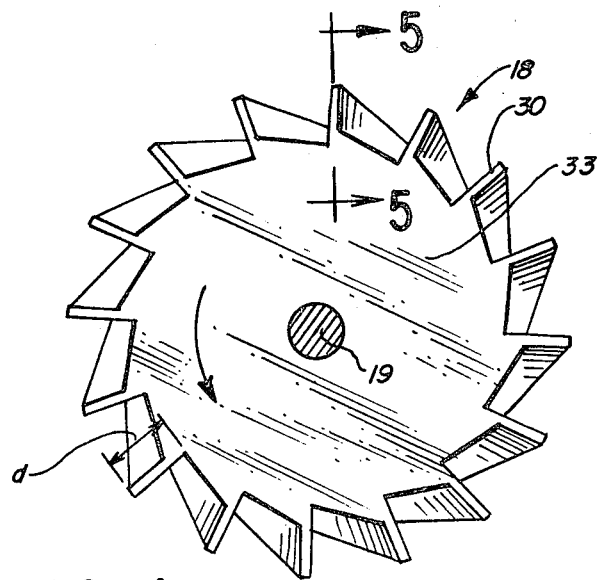
FIG. 4 is an elevation of a double angle milling cutter tool for cutting the sleeve.
Figure 5:
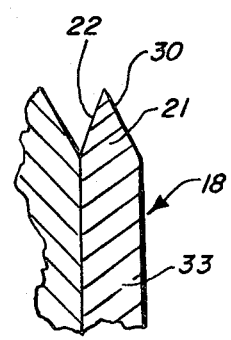
FIG. 5 is a framentary sectional view taken along line 5—5 of FIG. 4.

Each double angle milling cutter 18, as shown in FIGS. 4 and 5, is defined by a circular body section 33 and a plurality of cutting edges 30 regularly arranged about its circumference. The depth (d) of cutter edge 30 is almost equal to that of the ribs in the belt. Cutting edge 30, as shown, has a triangular cross section configuration. The double angle milling attachment 14 must be rotated in the direction designated by an arrow, in such a manner that precise V-grooves are cut into the outer surface 31 of the belt sleeve 8.

By causing the attachment 14 and mandrel 15 to be rotated in opposite directions, it is possible to cut precise accurate V-grooves as a result of the double angle milling cutters pushing into the belt sleeve, while at the same time, the life of the cutting edge is effectively maximized.

In effecting the cutting of the V-grooves in the belt section 13, the rotating milling attachment 14 is slowly moved toward the rotating mandrel 15, namely, in the arrow direction (a) shown in FIG. 3, by a translating means 20 to urge the cutter into one end portion of the belt sleeve 8 whereupon the desired V-grooves are accurately cut into the outer surface 31 of the belt sleeve. In order to form the desired triangular ribs 6, the double angle milling cutters 18 are pushed into the belt sleeve until the top of the V-shaped grooves 22 thereof are disposed at the outer surface 31 of the belt sleeve.

The cutting speed of milling attachment 14 is preferably greater than the revolution speed of the surface 31 and preferably is from 30 to 130 times the surface speed in order to provide the V-grooves of the belt with a proper rough surface. At a ratio of less than approximately 30 to 1, the surfaces of the V-grooves are excessively rough, and the cutting step is inefficiently time consuming. On the other hand, at a ratio of more than 130 to 1, the V-groove surface of the belt is undesirably smooth so that the belt is liable to slip in use because of the coefficient of friction.

The desirable ratio of feed of milling attachment 14 radially toward mandrel 15 is a function of the hardness of the belt sleeve. More specifically, since each of the double angle milling cutters 18 is concurrently engaging upper rubber layer 13 in the cutting operation, there is a tendency for upper rubber layer 13 to deform.

The upper and lower layers 13 and 16 may be made of a suitable elastomeric material, such as NR, SBR, rubber compound obtained by mixing short fibers in the above described rubber, polyurethane resin, etc. The hardness (shore-A) of the elastomeric material is preferably from approximately 75° to 90°. The feed velocity of milling attachment 14 cutters into the belt sleeve outer layer is preferably approximately 2 to 10 mm/min.

If the feed velocity of the milling attachment is greater than 10 mm/min., it is difficult to cut the V-grooves precisely because of the resultant deformation of the belt sleeve. The milling attachment may be moved into the belt sleeve at a constant speed or intermittently, as desired.

Figure 6:
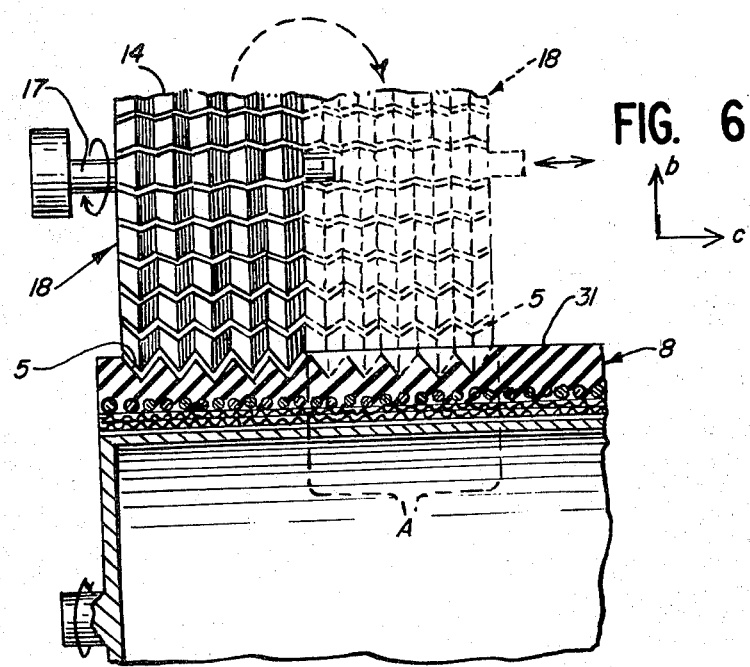
FIG. 6 is a fragmentary sectional view illustrating the arrangement of the cutter tool at the completion of the cutting operation.

FIG. 6 shows the arrangement of the apparatus at the end of the cutting step. The milling cutters have been urged deeply into the belt sleeve to a position near tensile member 12 whereby precise V-grooves are cut into the outer layer of the belt sleeve.

The milling attachment 14 is then moved by translating means 20 away from mandrel 15 in the arrow direction (b) shown in FIG. 6, to space the cutters from the sleeve belt.

The milling attachment 14 may now be moved by means 20 in the direction of the arrow (c) i.e., parallel to the drive shaft 17 into alignment with belt sleeve portion A to permit V-grooves to be cut in the portion A in a manner similar to that discussed above.

As will be obvious to those skilled in the art, milling attachment 14 may be moved automatically in a preselected manner to provide the cut belt.

The belt sleeve having the plurality of V-grooves is then suitably cut into discrete annular ribbed belts by a conventional cutting machine, as well known in the art.

Figure 7:
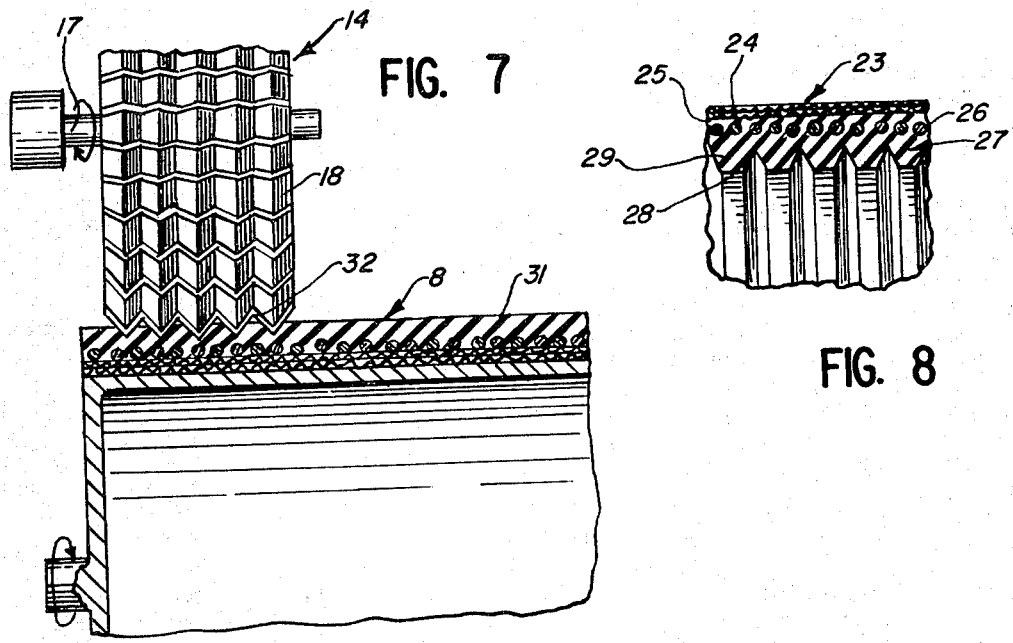
FIG. 7 is a fragmentary sectional view illustrating the method of manufacture of another exemplary embodiment of a ribbed belt in accordance with the invention.
Figure 8:
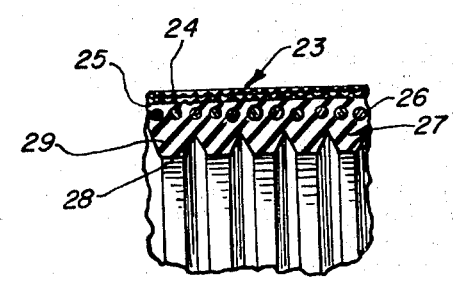
FIG. 8 is a cross section of a ribbed belt made by the method of FIG. 7.

FIG. 7 illustrates a modified method embodying the invention for manufacturing another exemplary embodiment of ribbed belt 23 illustrated in FIG. 8. Belt 23 is flat across the top 29 of the ribbed section 27. Ribbed belt 23, as shown in FIG. 8, comprises an outer fabric layer 24, an upper rubber layer 25, a tensile member 26, and a ribbed section 27. Section 27 is defined by a plurality of longitudinally extending ribs 28 each having a trapezoidal cross section. It will be seen that the thickness of the upper rubber layer 13, shown in FIG. 7, may be a fraction, such as half of that of the upper rubber layer 13 shown in FIGS. 3 and 6.

The double angle milling cutters 18 are urged only partially into belt sleeve 8 so that the top 32 of the V-shaped groove 22 remains spaced from outer surface 31 of belt sleeve 8. Resultingly, ribbed section 27 defines a trapezoidal cross section configuration. The final manufacturing step in forming the belt 23 may be carried out as described above relative to belt 1.

Figure 9:
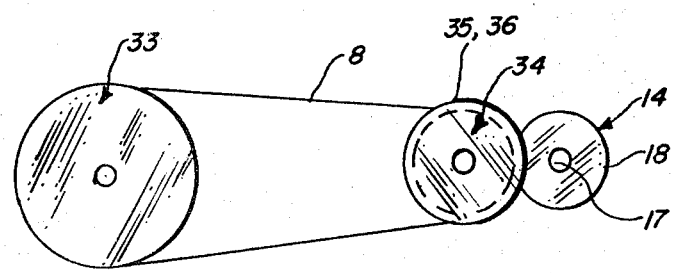
FIG. 9 is a side elevation showing a step in the method of manufacturing a long ribbed belt in accordance with the invention.

FIG. 9 shows a modified step in the manufacture of a ribbed belt, advantageously adapted for use in making a longlength ribbed belt. As shown, long belt sleeve 8 is entrained about both a driving mandrel 33 and a driven mandrel 34. The belt sleeve is stretched thereabout in order to prevent slip of the belt sleeve during the cutting operation. Driven mandrel 34 has flanges 35,36 on each side for preventing transverse shifting of the belt sleeve during the cutting step. All other steps are similar to hose described above.

Thus, in accordance with the disclosed invention, the V-grooves of the ribbed belts are cut precisely into the rib-forming section and have a preselected desired rough surface. The ribbed belts thusly manufactured have excellent power transmission characteristics and do not produce sticky adhesion as a result of generation of heat in use.

Thus, the method of belt manufacture of the present invention provides a significantly improved manufacture of such ribbed belts, overcoming the prior art problems incurred in the use of grinding wheels to form the belt grooves.

It is apparent that other modifications may be made without departing from the scope of this invention.

We claim:

1. In a drive system having a pulley provided with round tipped annular ribs with grooves therebetween defining inner sharp tips defined by substantially intersecting planar side walls of the grooves, and a complementary ribbed V-belt having a rubber body, the improvement comprising
    the provision of a plurality of longitudinally extending ribs in said body defined by sharp-tipped distal ends with sharp-tipped V-grooves therebetween, the tips of the V-grooves defining a relief space to be disposed outwardly of the round-tipped pulley ribs and said distal ends having full facial contact with the pulley grooves inwardly to said inner tips.

2. The drive system V-belt of claim 1 wherein said pulley grooves are sharp-tipped and said V-belt ribs define sharp-tipped distal ends accurately complementary to said sharp-tipped pulley grooves.

3. The drive system V-belt of claim 1 wherein said sharp-tipped grooves comprise precisely cut grooves.

4. The drive system V-belt of claim 1 wherein said pulley ribs are trapezoidal in cross section.

5. The drive system V-belt of claim 1 wherein said pulley ribs are triangular in cross section.

6. The drive system V-belt of claim 1 wherein said belt ribs are free of sticky adhesion to the pulley notwithstanding generation of substantial heat therein during use of said drive system.

7. The drive system V-belt of claim 1 wherein said belt ribs have a preselected rough surface.

* * * * *